No. 739,137.

Patented September 15, 1903.

UNITED STATES PATENT OFFICE.

CARL BACHE-WIIG, OF BÓN, NORWAY, ASSIGNOR TO BERTHA BACHE-WIIG, OF BÓN, NEAR CHRISTIANIA, NORWAY.

METHOD OF PRESERVING EGGS.

SPECIFICATION forming part of Letters Patent No. 739,137, dated September 15, 1903.

Application filed October 29, 1901. Serial No. 80,445. (No specimens.)

*To all whom it may concern:*

Be it known that I, CARL BACHE-WIIG, a subject of the King of Sweden and Norway, residing at Bón, near Christiania, Norway, have invented certain new and useful Improvements in and Relating to the Preservation of Eggs and other Articles of Food; and I do hereby declare the following to be a full, clear, and exact description of the invention, such as will enable others skilled in the art to which it appertains to make and use the same.

My invention relates to the preservation of articles of food by providing the same with a thin protective coating which may be easily removed previously to the use of the food and which is not in itself of such a character as to affect the taste of the article.

The preservative material according to this invention is particularly suitable for keeping eggs, for keeping the same in a good state of preservation for some length of time.

My invention is also particularly well applicable to fruit—such as apples, pears, or the like—and it may be used also for meat and the like.

The preservative material in question is the waste lye from the sulfite wood-pulp manufacture. I prefer to subject such lye previously to its use to vaporization in order to volatilize the sulfur compounds contained therein and to make it of a more thick consistence. When, for instance, an egg is immersed in the said fluid, it will be covered all over its surface with a thin continuous coating of highly-preservative effect. This effect is due to the ability peculiar to this fluid of choking up all pores with an antiseptic substance, such lye consisting generally of an aqueous solution of gelatinous matters, resinous soaps, sugar, &c., and containing chemical compounds of an antiseptic quality. Such waste lye being obtainable in any quantity from the pulp-factories and having no other industrial use, it is very suitable for the purpose of this invention.

I am well aware that heretofore it has been tried to preserve eggs by providing a coating on the same; but as far as I know these methods have not proved successful. The coating used by me has special qualities which render it more suitable. It is completely air-tight and antiseptic, and as it is easy to be removed wholly from the eggs the latter when being boiled are not liable to burst. I may also use this preservative in the manner that the eggs or other articles of food are first wrapped in paper or other fibrous material and then dipped in the fluid, or paper or the like may be coated with the lye and then used for wrapping in the the articles.

When preserving eggs I prefer to before coating the eggs to expel the air from them by heating them to about 140° to 150°.

I claim—

The herein-described method of preserving eggs consisting in first heating the eggs to about 140° to 150° Fahrenheit and then coating them with waste sulfite lye freed from sulfur compounds, as set forth.

In witness whereof I have hereunto set my hand in presence of two witnesses.

CARL BACHE-WIIG.

Witnesses:
ALFRED J. BRYN,
AUG. OLSEN.